US011945342B2

(12) United States Patent
Urano et al.

(10) Patent No.: US 11,945,342 B2
(45) Date of Patent: *Apr. 2, 2024

(54) AUTONOMOUS SEAT ADJUSTMENT IN A VEHICLE

(71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/363,644

(22) Filed: Jun. 30, 2021

(65) Prior Publication Data

US 2021/0323445 A1 Oct. 21, 2021

Related U.S. Application Data

(63) Continuation of application No. 16/221,026, filed on Dec. 14, 2018, now Pat. No. 11,077,771.

(51) Int. Cl.
*B60N 2/02* (2006.01)
*B60N 2/00* (2006.01)
*G06V 20/56* (2022.01)
*G06V 40/10* (2022.01)

(52) U.S. Cl.
CPC ........... *B60N 2/0248* (2013.01); *B60N 2/002* (2013.01); *G06V 20/56* (2022.01); *G06V 40/103* (2022.01)

(58) Field of Classification Search
None
See application file for complete search history.

(56) References Cited

U.S. PATENT DOCUMENTS 10,126,749 B2 * 11/2018 Rander .............. G05D 23/1905
10,220,754 B2 * 3/2019 Dry ...................... B60N 2/3075
11,077,771 B2 8/2021 Urano et al.

FOREIGN PATENT DOCUMENTS

WO WO-2020020464 A1 * 1/2020 ........... G06Q 10/063

* cited by examiner

*Primary Examiner* — Abdhesh K Jha
(74) *Attorney, Agent, or Firm* — Seyfarth Shaw LLP

(57) ABSTRACT

A method for adjusting a seat in a vehicle includes adjusting the seat from an initial position to a passenger adjusted position based on receiving an input from a passenger. The method further includes determining the passenger exited the vehicle after adjusting the seat and predicting a likelihood of the passenger returning to the vehicle based on determining the passenger exited the vehicle. The method also includes adjusting the seat to the initial position based on the likelihood of the passenger returning is less than a passenger returning threshold. The method still further includes identifying a person approaching the vehicle after the passenger exited the vehicle based on information captured by one or more sensors of the vehicle. The method also includes adjusting the seat to a position associated with the previous passenger based on identifying the person approaching the vehicle as the previous passenger.

20 Claims, 5 Drawing Sheets

AUTONOMOUS SEAT ADJUSTMENT IN A VEHICLE

CROSS-REFERENCE TO RELATED APPLICATION

This application is a continuation of U.S. patent application Ser. No. 16/221,026, filed on Dec. 14, 2018, and entitled "AUTONOMOUS SEAT ADJUSTMENT IN A VEHICLE," the disclosure of which is expressly incorporated by reference herein in its entirety.

BACKGROUND

Field

Certain aspects of the present disclosure generally relate to vehicle seats and, more particularly, to a system and method for autonomously adjusting a vehicle seat.

Background

A conventional seat in a vehicle may be adjusted to an occupant's desired position. For example, the occupant adjusts one or more of a reclining angle, a fore/aft position, and a height of the seat until the desired position is obtained. When different people share a vehicle, such as a mobility-as-a-service (MAAS) vehicle (e.g., ride-share vehicle), the previous passenger may have adjusted the seat to a position that is undesirable to a subsequent passenger. In some cases, the subsequent passenger may not know how to adjust the seat. As such, the subsequent passenger may remain in the undesirable position for the duration of the trip.

In some conventional seat adjustment systems, the seat returns to a default position when a passenger leaves the vehicle. Returning the seat to the default position may alleviate situations where a new passenger sits in the previous passengers adjusted seat position. Still, this may be inconvenient if the same passenger returns to the vehicle. It is desirable to improve seat adjustment systems to accommodate new passengers as well as returning passengers.

SUMMARY

In one aspect of the present disclosure, a method for adjusting a seat in a vehicle is disclosed. The method includes receiving a user input from a passenger to adjust the seat from a default position to a passenger adjusted position. The method also includes predicting, in response to the passenger exiting the vehicle, a likelihood of the passenger returning to the vehicle. The method further includes maintaining the passenger adjusted position when the likelihood of the passenger returning to the vehicle is greater than a threshold.

In another aspect of the present disclosure, a non-transitory computer-readable medium with non-transitory program code recorded thereon is disclosed. The program code is for adjusting a seat in a vehicle. The program code is executed by a processor and includes program code to receive a user input from a passenger to adjust the seat from a default position to a passenger adjusted position. The program code also includes program code to predict, in response to the passenger exiting the vehicle, a likelihood of the passenger returning to the vehicle. The program code further includes program code to maintain the passenger adjusted position when the likelihood of the passenger returning to the vehicle is greater than a threshold.

Another aspect of the present disclosure is directed to an apparatus for adjusting a seat in a vehicle. The apparatus having a memory and one or more processors coupled to the memory. The processor(s) is configured to receive a user input from a passenger to adjust the seat from a default position to a passenger adjusted position. The processor(s) is also configured to predict, in response to the passenger exiting the vehicle, a likelihood of the passenger returning to the vehicle. The processor(s) is further configured to maintain the passenger adjusted position when the likelihood of the passenger returning to the vehicle is greater than a threshold.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
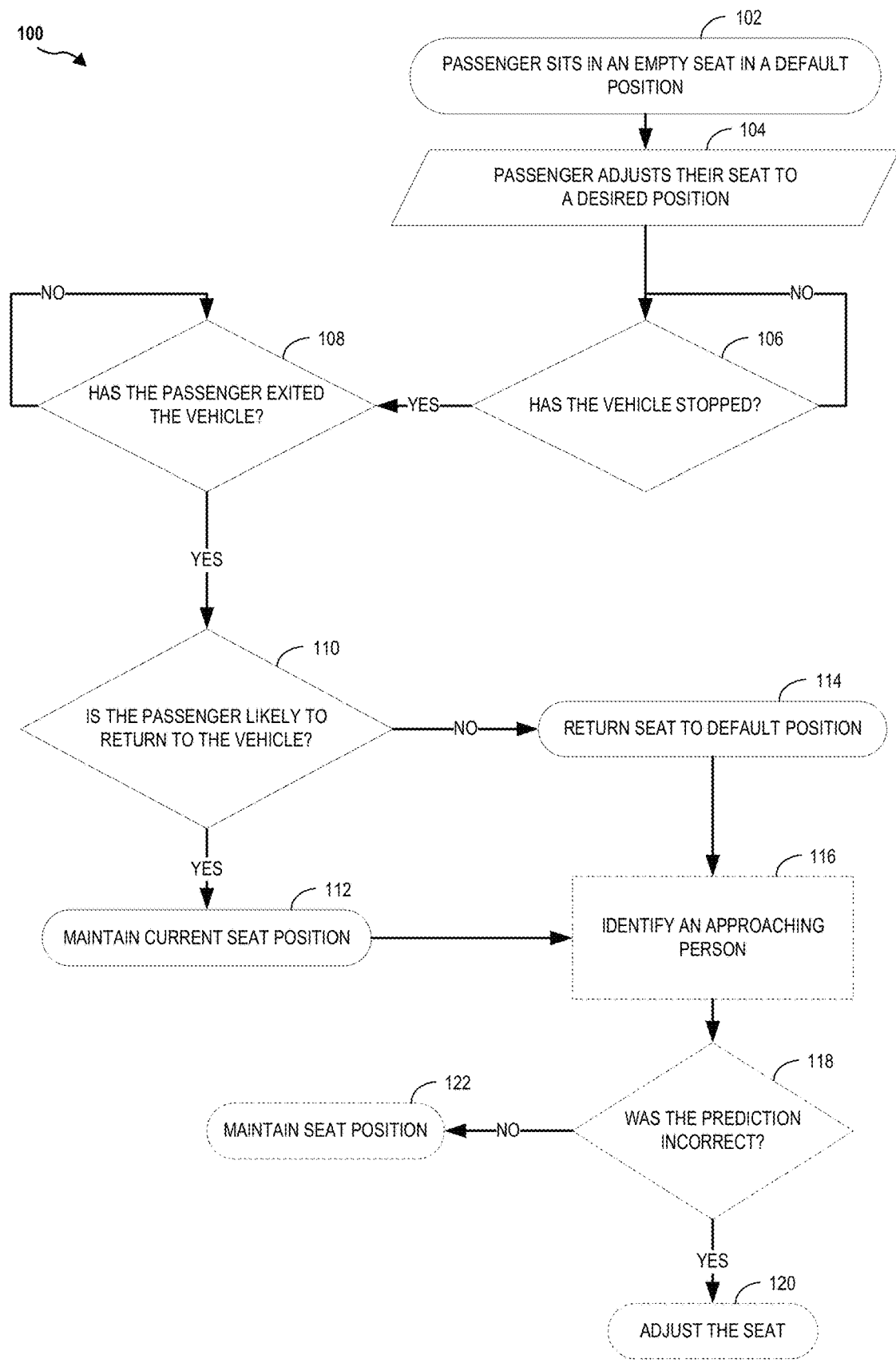
FIGS. 1 and 2 illustrate flow diagrams for adjusting a seat, according to aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

A conventional seat in a vehicle may be adjusted to an occupant's desired position. For example, the occupant adjusts one or more of a reclining angle, a fore/aft position, and a height of the vehicle seat until the desired position is obtained. The seat may be adjusted via electronic or manual controls. When different people share a vehicle, such as an MAAS vehicle or a rental vehicle, the previous passenger may have adjusted the seat to a position that is undesirable to a subsequent passenger. In some cases, the subsequent passenger may not know how to adjust the seat. As such, the subsequent passenger may remain in the undesirable position for the duration of the trip.

To mitigate the subsequent passenger's potential discomfort, some conventional seat adjustment systems return the seat to a default position when the seat's occupant leaves the vehicle. For example, when an initial passenger enters the vehicle, the seat may be in a default position. The initial passenger may adjust the seat from the default position to their desired position. When the initial passenger leaves the seat (e.g., vehicle), the seat adjustment system returns the seat to the default position.

In the present example, if a subsequent passenger does not know how to adjust the seat, the subsequent passenger may remain in the default position rather than the previous passenger's desired position (e.g., adjusted position). The default position may be more comfortable in comparison to the previous passenger's desired position. The default position may be a position determined based on average body proportions or an average seat position.

Returning the seat to the default position may alleviate situations where a new passenger sits in the previous passenger's desired position. Still, this may be inconvenient if the same passenger returns to the vehicle. It is desirable to improve vehicle seat adjustment systems to accommodate new passengers as well as returning passengers.

Aspects of the present disclosure are directed to maintaining a seat position when it is likely that a passenger will return to a vehicle. That is, when a passenger leaves the vehicle, the vehicle predicts whether a passenger will return. The seat does not reset to a default position if the passenger is predicted to return. Rather, the current seat position is maintained. Various factors may be used to predict whether the passenger will return to the vehicle.

FIG. 1 illustrates an example of a flowchart 100 for determining whether to maintain a seat position, according to aspects of the present disclosure. As shown in FIG. 1, at block 102, a passenger sits in an empty seat in a default position. The vehicle may include one or more empty seats. Each empty seat may have been previously set to the default position by a seat adjustment system. For example, a seat may be set to the default position when the vehicle predicts that a previous passenger would not return to the vehicle. The seat adjustment system detects that the seat is occupied based on, for example, a seat pressure sensor, one or more internal vehicle sensors, such as a camera, or a seat adjustment. For example, when the passenger adjusts the seat, the seat adjustment system determines that the seat is occupied.

The default position may be set by the manufacturer based on average body dimensions. The average body dimensions may vary by region. The default position may be updated via a wireless manufacturer update. In one configuration, the seat adjustment system determines an average adjusted position based on the adjusted positions of multiple users. In this configuration, the default position is updated based on the average adjusted position.

At block 104, the passenger adjusts their seat to a desired position. For example, the passenger adjusts one or more of a reclining angle, a headrest position, a seat height, a fore/aft position, lumbar support position, side positions, and/or other possible seat configurations. The seat may be adjusted via an interface in the vehicle and/or an interface on the passenger's device, such as a mobile phone. The desired position may also be referred to as the adjusted position.

The adjusted position may be stored in the vehicle's memory. Furthermore, the adjusted position may be associated with the passenger based on one or more identifying characteristics of the passenger. The identifying characteristics may include, but are not limited to, the passenger's facial features, a unique identifier of the passenger's mobile device, and/or the passenger's weight/pressure. The passenger's facial features may be identified by an internal or external vehicle sensor, such as a red-green-blue (RGB) camera. The unique identifier of the passenger's mobile device may be identified when the phone connects to the vehicle. As an example, the unique identifier may be a phone number, Bluetooth™ ID, and/or a subscriber identification module (SIM) ID.

At block 106, the seat adjustment system determines whether the vehicle has stopped. For example, the vehicle may stop at a location. The vehicle may arrive at the location while operating in a manual mode, a semi-autonomous mode, or an autonomous mode. The seat adjustment system may determine that the vehicle has stopped based on a destination input from the passenger. That is, the vehicle's location data, such as global positioning system (GPS) data, may be used to determine whether the vehicle has arrived at the location. Additionally, or alternatively, stopping the vehicle and turning the engine off may indicate that the vehicle has arrived at the location.

In some cases, the vehicle may stop prior to arriving at the destination. For example, the vehicle may be stopped at a stop sign or at a traffic light. To mitigate false positives, the seat adjustment system may determine if the vehicle is stopped for a period of time that is greater than a threshold. Additionally, if the vehicle determines that the passenger has not exited the vehicle (block 108), the vehicle may continue to monitor the vehicle's movement to determine whether it has stopped (block 106).

If the vehicle has not stopped, the seat adjustment system continues to monitor the vehicle's movement to determine whether it has stopped (block 106). If the vehicle has stopped, the seat adjustment system determines if the passenger (e.g., seat occupant) has exited the vehicle (block 108). One or more triggers may be used to determine whether the passenger has exited the vehicle. These triggers include, but are not limited to, a door sensor detecting an opening and closing of a door, a pressure sensor detecting a change in pressure (e.g., weight) on the seat, and a vision sensor, such as a camera, detecting a motion of the passenger exiting the vehicle.

In one configuration, the opening and closing of the door adjacent to an occupied seat may indicate that the passenger exited the vehicle. Additionally, each seat may include the pressure sensor. The pressure sensor detects a passenger's weight, thereby indicating that the seat is occupied. A change in pressure may indicate that the passenger exited the vehicle. The vehicle may also include one or more vision sensors, such as an RGB camera, to determine whether the passenger has exited the vehicle. The sensor(s) may capture an internal and/or external view of the vehicle. For example, an internal RGB camera may view the passenger exiting the vehicle and an external RGB camera may view the passenger walking away from the vehicle. The captured images may be processed by a pre-trained neural network to determine whether the passenger has exited the vehicle.

One of the aforementioned triggers or any combination thereof may be used to determine whether the passenger has exited the vehicle. For example, when the seat pressure changes from an occupied pressure to an unoccupied pressure, the vehicle may further use the door opening/closing data and/or sensor data to determine whether the passenger has exited the vehicle. If the passenger has not exited the vehicle, the seat adjustment system continues to monitor the passenger's occupancy status while the vehicle is stopped (block 108). If the passenger has exited the vehicle, the seat adjustment system determines whether the passenger is likely to return to the vehicle (block 110).

The likelihood of the passenger returning to the vehicle may be based on one or more of the vehicle's current location, a time remaining for the vehicle rental, and/or data captured by one or more vehicle sensors. In one configuration, the seat adjustment system determines the vehicle's current location (e.g., the location where the vehicle stopped). Based on stored map information and/or map information obtained via an external data source (e.g., the Internet), the seat adjustment system determines services offered near the current location. The services may include, but are not limited to, a restaurant, coffee store, retail store, grocery store, gas station, bank, etc. The types of services offered and/or a distance to the services may indicate whether the passenger is likely to return to the vehicle.

For example, if the vehicle stops near a shopping mall, the seat adjustment system predicts that the passenger is going shopping and will most likely return to the vehicle. As another example, if the vehicle stops at a vehicle return center, the seat adjustment system predicts that the passenger is returning the vehicle and will not return to the vehicle. The likelihood of the passenger returning may be based on pre-trained behaviors for each type of location. The behaviors may be adjusted based on patterns for specific customers. A specific customer may be identified by their mobile device, reservation information, facial recognition, seat weight, and/or other factors.

In addition to nearby services, the seat adjustment system may determine whether the vehicle is near a location associated with the passenger, such as the passenger's office or home. These locations may be learned or pre-set by the passenger. If the passenger is the primary driver/occupant, the seat adjustment system may maintain the current seat position (block 112) when the vehicle is at the passenger's home or office. If the vehicle is a shared vehicle, the seat adjustment system may return the seat to the default position (block 114) when the vehicle is at the passenger's home or office.

As discussed herein, the vehicle may be an MAAS vehicle or a long-term rental vehicle. In one configuration, the seat adjustment system determines a time remaining for the vehicle rental. For example, if the vehicle has been rented for twenty-four hours and if the passenger is the only listed driver, the seat does not return to the default position during the twenty-four period. In this example, when the passenger exits the vehicle, the seat adjustment system assumes the passenger will be returning to the reserved vehicle. The seat adjustment system may also consider a situation where the vehicle is returned to a vehicle return center prior to the expiration of the reservation period. In this case, the seat is returned to the default position (block 114) when the passenger exits the vehicle at the rental car return center.

For an MAAS vehicle, the seat adjustment system may also consider if the passenger's ride is complete. For example, if the passenger has reached a destination indicated when reserving the MAAS vehicle, the seat adjustment system may determine that the passenger's ride is complete. The seat may be moved to the default position when the ride is complete. The seat may also be moved to the default position if a reservation by another passenger is received after the ride is complete.

In another configuration, one or more vehicle sensors are used to determine if the passenger that previously occupied the seat is returning to the vehicle. The sensors may include an RGB camera, a location sensor, or other type of sensor. For example, when the passenger exits the vehicle, the seat may remain in the adjusted position until the vehicle detects a person walking towards the vehicle. The RGB camera may capture an image of the person walking towards the vehicle. If the person is the same as the previous passenger, the seat position is maintained (block 112). If the person is different, the seat moves to the default position (block 114). Additionally, the person may be different from the previous driver, still the vehicle may recognize the person. In this situation, the seat may move to a position corresponding to the recognized person. The seat position for each previous passenger may be stored in the vehicle's memory.

As another example, the passenger's mobile device location may be used to determine the likelihood of the passenger returning to the vehicle. Upon entering the vehicle, or reserving the vehicle, the seat adjustment system may connect with the mobile device. When the passenger exits the vehicle, the seat adjustment system may track the passenger's location.

If the passenger leaves the mobile device in the car, or if the passenger's distance to the vehicle does not exceed a threshold, the seat adjustment system may determine that the passenger intends to return to the vehicle. If the passenger's distance to the vehicle exceeds a threshold, the seat adjustment system may determine that the passenger does not intend to return to the vehicle. In some cases, the passenger's distance to the vehicle exceeds the threshold when the passenger is traveling. Thus, the seat adjustment system may consider the vehicle's current location, such as the passenger's home, long-term airport parking, vehicle return center, etc., to determine whether the passenger intends to return to the vehicle.

If the seat adjustment system determines that the passenger is likely to return to the vehicle, the seat remains in the adjusted position (block 112). Alternatively, if the seat adjustment system determines that the passenger is not likely to return to the vehicle, the seat is adjusted to the default position (block 114). The seat may be adjusted in response to signaling between the seat adjustment system and one or more seat adjustment mechanisms.

The factors discussed above may be considered as a whole to determine a value for the likelihood of the passenger returning. Different factors may receive different weights. For example, returning the vehicle to a vehicle return center may be weighed more than the vehicle being stopped near a grocery store. The determined value may be compared to a threshold. If the value is greater than the threshold, the seat adjustment system determines that the passenger is likely to return. If the value is less than the threshold, the seat adjustment system determines that the passenger is not likely to return.

In some cases, the seat adjustment system's predictions for the passenger's return may be incorrect (e.g. false negative or false positive). In an optional configuration, after adjusting the seat position to the default position (block 114) or after maintaining the current seat position (block 112), the seat adjustment system attempts to identify an approaching person (block 116). The approaching person refers to a person that is approaching the vehicle. As discussed in further detail below, one or more vehicle sensors may be used to determine if the passenger that previously occupied the seat is returning to the vehicle. The sensors may include an RGB camera, a location sensor, or other type of sensor. For example, the RGB camera may capture an image of the person walking towards the vehicle.

The identification, at block 116, determines whether the approaching person is a same person as the previous passenger (e.g., the passenger that exited the vehicle at block 108). In this optional configuration, at block 118, the seat adjustment system determines whether the prediction, at block 110, was incorrect. For example, at block 110, the seat adjustment system may predict that the passenger is not likely to return. In this example for the optional configuration, if the approaching person is identified as the previous passenger (block 116), the seat adjustment system determines that the prediction was incorrect (block 118). As another example, at block 110, the seat adjustment system may have predicted that the passenger was likely to return. In this example for the optional configuration, if the approaching person is not the same as the previous passenger (block 116), the seat adjustment system determines that the prediction was incorrect (block 118).

If the prediction is incorrect, in this optional configuration, the seat is adjusted (block 120). The adjustment is made to correct the adjustment of block 114 or block 112. For example, if the previous passenger is identified as the approaching person (block 116) and the seat was moved to the default position (block 114), the seat is moved to the previous passenger's adjusted position (block 120). As another example, if the previous passenger is not identified as the approaching person (block 116) and the current seat position was maintained (block 112), the seat is moved to the default position (block 120).

If the prediction was correct, in this optional configuration, the seat position is maintained (block 122). That is, the position of block 114 or block 112 is maintained. For example, if the previous passenger is identified as the approaching person (block 116) and the current seat was maintained (block 112), the current seat position is also maintained (block 122). As another example, if the previous passenger is not identified as the approaching person (block 116) and the seat was moved to the default position (block 114), the default position is maintained (block 122).

Figure 2:
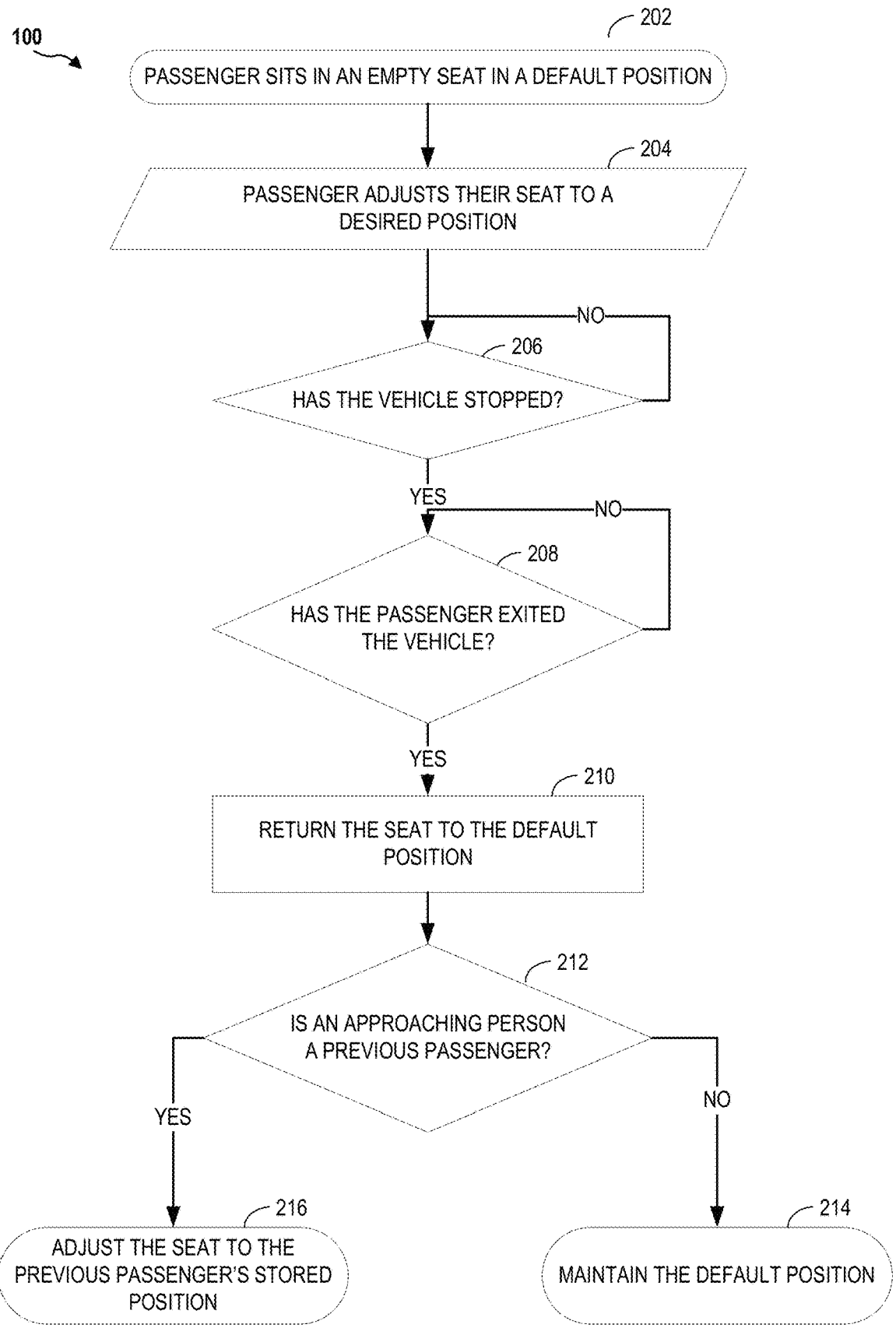

In one configuration, in response to the passenger exiting the vehicle, the seat is adjusted to the default position. In this configuration, the vehicle identifies the passenger approaching the vehicle and adjusts the seat based on the identified passenger. FIG. 2 illustrates an example of a flowchart 200 for adjusting a seat position, according to aspects of the present disclosure. As shown in FIG. 2, at block 202, a passenger sits in an empty seat in a default position.

At block 204, the passenger adjusts their seat to a desired position. For example, the passenger adjusts one or more of a reclining angle, a headrest position, a seat height, a fore/aft position, lumbar support position, side positions, and/or other possible seat configurations. At block 206, the seat adjustment system determines whether the vehicle has stopped. As discussed herein, the seat adjustment system may use a GPS location, vehicle locomotion, and/or engine on/off state to determine whether the vehicle has stopped.

As discussed, the vehicle may stop prior to arriving at the destination. For example, the vehicle may be stopped at a stop sign or at a traffic light. To mitigate false positives, the seat adjustment system may determine if the vehicle is stopped for a period of time that is greater than a threshold. Additionally, if the vehicle determines that the passenger has not exited the vehicle (block 208), the vehicle may continue to monitor the vehicle's movement to determine whether it has stopped (block 206).

If the vehicle has not stopped, the seat adjustment system continues to monitor the vehicle's movement to determine whether it has stopped (block 206). If the vehicle has stopped, the seat adjustment system determines if the passenger (e.g., seat occupant) has exited the vehicle (block 208). One or more triggers may be used to determine whether the passenger has exited the vehicle. These triggers include, but are not limited to, a door opening and then closing, a change in pressure (e.g., weight on the seat), and a sensor, such as a camera, detecting a motion of the passenger exiting the vehicle.

If the passenger has not exited the vehicle, the seat adjustment system continues to monitor the passenger's occupancy status while the vehicle is stopped (block 208). If the passenger has exited the vehicle, the seat adjustment system adjusts the seat to the default position (block 210). In response to adjusting the seat to the default position, the seat adjustment system monitors the vehicle's surroundings to identify the person (e.g., passenger) approaching the vehicle.

One or more vehicle sensors may be used to determine if the passenger that previously occupied the seat is returning to the vehicle. The sensors may include an RGB camera, a location sensor, or other type of sensor. For example, the RGB camera may capture an image of the person walking towards the vehicle. At block 212, the seat adjustment system determines if an approaching person is one of the vehicle's previous passengers. The approaching person refers to a person approaching the vehicle (e.g., the person's distance to the vehicle is less than a threshold).

The previous passengers refer to the last passenger to occupy the vehicle as well as one or more passengers prior to the last passenger. If the approaching person is not identified, the seat is maintained in the default position (block 214). If the approaching person is identified as a previous passenger, the seat is moved to a position corresponding to the identified previous passenger (block 216). The seat position for each previous passenger may be stored in the vehicle's memory. Facial data and/or other information, such as seat pressure, may be stored along with the seat position for each previous passenger.

As another example, the passenger's mobile device location may be used to identify the passenger returning to the vehicle. In this example, a remote location may monitor the passenger's location via their mobile device. For example, the mobile device's GPS data may be used to monitor the passenger's location. The remote location also tracks the location of the vehicle via GPS data. When the passenger's location to the vehicle is less than a threshold, the remote location transmits the passenger identification information to the seat adjustment system. The passenger identification information may be accompanied with a message indicating that the passenger is returning to the vehicle. In response, the seat adjustment system moves the seat to a position corresponding to the identified previous passenger (block 216). If the person is not identified as a previous passenger, the seat is maintained in the default position (block 214).

According to aspects of the present disclosure, the seat adjustment system adjusts a seat based on passenger identification information when the passenger reserves the vehicle. In this configuration, the passenger may request an on-demand ride or a long-term reservation. In response to the reservation, the seat adjustment system adjusts the seat to a position corresponding to the passenger's desired position. The passenger's desired position may be stored in the passenger's profile and transmitted to the vehicle with the reservation. In this configuration, the seat is adjusted to a position corresponding to the identified person when the vehicle arrives to the passenger's location or when the passenger arrives at the vehicle.

The seat adjustment system may be configured for each seat in the vehicle. As such, determining whether to maintain the adjusted position or returning the seat to the default position is performed on a per-seat basis. That is, when a passenger exits the vehicle, the seat adjustment system may only determine whether to maintain the adjusted position or returning the seat to the default position for the previously occupied seat.

Figure 3:
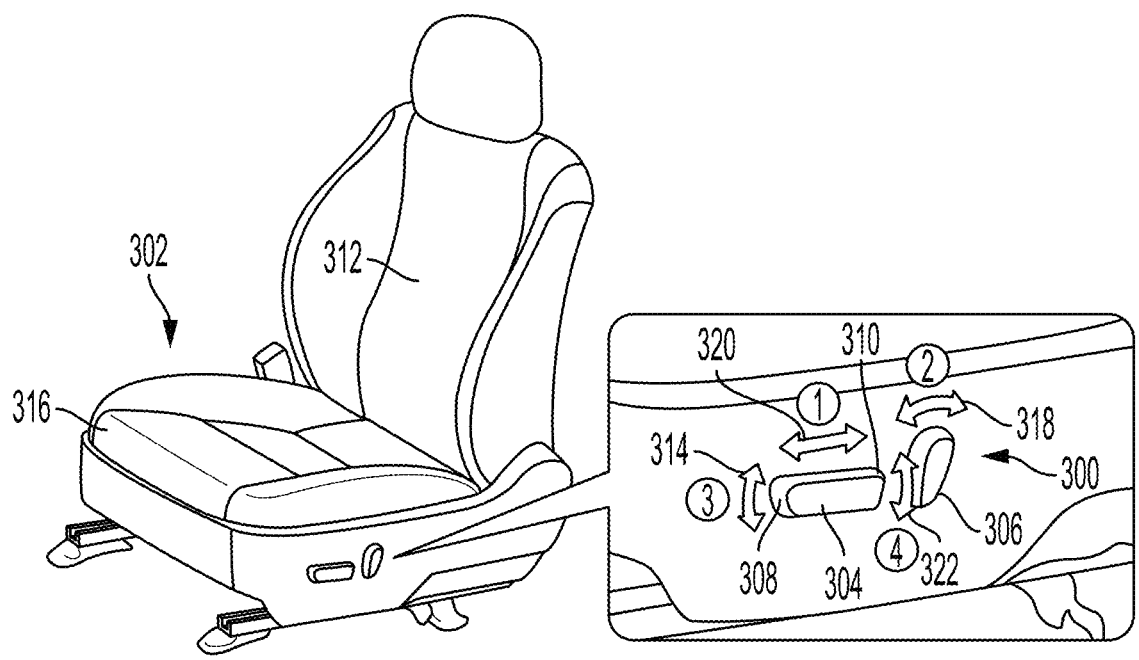
FIG. 3 illustrates an example of controls for adjusting a seat, according to aspects of the present disclosure.

FIG. 3 illustrates an example of seat controls 300, according to aspects of the present disclosure. As shown in FIG. 3, a seat 302 may include seat controls 300 to adjust a position of the seat 302. The seat controls 300 may include a seat fore/aft position adjuster 304, a seatback angle adjuster 306, a seat cushion angle adjuster 308, and a seat vertical height adjuster 310. The seat fore/aft position adjuster 304 moves the seat 302 forward or backward horizontally 320. The seatback angle adjuster 306 adjusts a vertical angle 318 of the seatback 312. The seat cushion angle adjuster 308 adjusts an elevation angle 314 of the seat cushion 316. The seat vertical height adjuster 310 adjusts a vertical height 322 of the seat 302. An occupant of the seat 302 (e.g., vehicle passenger) may adjust the seat 302 to a desired position via one or more of the seat controls 300.

Figure 4:
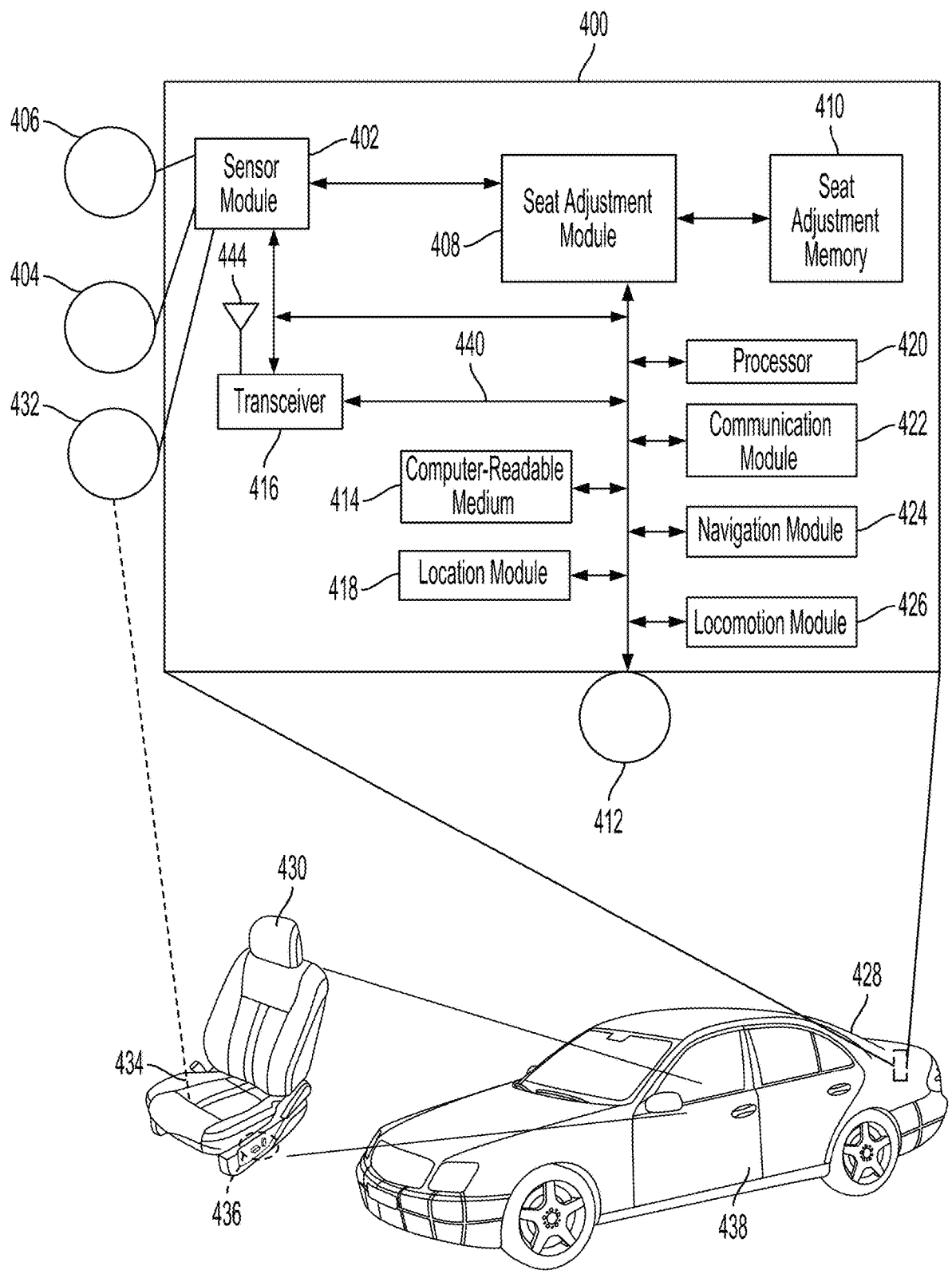
FIG. 4 is a diagram illustrating an example of a hardware implementation for a seat adjustment system, according to aspects of the present disclosure.

FIG. 4 is a diagram illustrating an example of a hardware implementation for a seat adjustment system 400, according to aspects of the present disclosure. The seat adjustment system 400 may be a component of a vehicle, a robotic device, or other device. For example, as shown in FIG. 4, the seat adjustment system 400 is a component of an MAAS vehicle 428. Aspects of the present disclosure are not limited to the seat adjustment system 400 being a component of the vehicle 428, as other devices, such as a bus, boat, drone, or robot, are also contemplated for using the seat adjustment system 400. The vehicle 428 may be autonomous or semi-autonomous. The modules may be software modules running in the processor 420, resident/stored in the computer-readable medium 414, one or more hardware modules coupled to the processor 420, or some combination thereof.

The seat adjustment system 400 may be implemented with a bus architecture, represented generally by a bus 440. The bus 440 may include any number of interconnecting buses and bridges depending on the specific application of the seat adjustment system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The seat adjustment system 400 includes a transceiver 416 coupled to the processor 420, the sensor module 402, a seat adjustment module 408, the communication module 422, the location module 418, the locomotion module 426, the navigation module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the seat adjustment module 408 to a server (not shown).

The seat adjustment system 400 includes the processor 420 coupled to the computer-readable medium 414. The processor 420 performs processing, including the execution of software stored on the computer-readable medium 414 providing functionality according to the disclosure. The software, when executed by the processor 420, causes the seat adjustment system 400 to perform the various functions described for a particular device, such as the vehicle 428, or any of the modules 402, 414, 416, 418, 420, 422, 424, 426. The computer-readable medium 414 may also be used for storing data that is manipulated by the processor 420 when executing the software.

The sensor module 402 may be used to obtain measurements via different sensors, such as a first vision sensor 406, a second vision sensor 404, and/or a seat sensor 432. The first vision sensor 406 may be a stereoscopic camera or an RGB camera, for capturing 2D images. The first vision sensor 406 may be an internal sensor. The second vision sensor 404 may be defined external to the vehicle 428 to capture an image of an approaching person. The second vision sensor 404 may also detect passengers that exit the vehicle 428. The seat sensor 432 detects weight on a seat 430. Each seat 430 in the vehicle 428 may include a seat sensor 432. The seat sensor 432 may be defined in a seat cushion 434.

The vehicle 428 may include other sensors to improve navigation, such as a ranging sensor, a light detection and ranging (LIDAR) sensor, or a radio detection and ranging (RADAR) sensor. Of course, aspects of the present disclosure are not limited to the aforementioned sensors as other types of sensors, such as, for example, thermal, sonar, and/or lasers are also contemplated for either of the vision sensors 404, 406. The measurements of the first vision sensor 406, the second vision sensor 404, and the seat sensor 432 may be processed by one or more of the processor 420, the sensor module 402, the communication module 422, the location module 418, the locomotion module 426, the navigation module 424, in conjunction with the computer-readable medium 414 to implement the functionality described herein. In one configuration, the data captured by the first vision sensor 406, the second vision sensor 404, and the seat sensor 432 may be transmitted to an external device via the transceiver 416.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the seat adjustment system 400.

The locomotion module 426 may be used to facilitate locomotion of the vehicle 428. As an example, the locomotion module 426 may control movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The seat adjustment system 400 includes a seat adjustment module 408 in communication with a seat adjustment memory 410. The seat adjustment memory 410 may be distinct from a memory of the vehicle (not shown) or may be included as part of the vehicle memory. The seat adjustment module 408 may be in communication with a seat adjustment control module 412 for each seat 430 of the vehicle 428. The seat adjustment control module 412 controls one or more mechanical components of the seat 430. The mechanical components may include motors, gears, etc., for adjusting a position of the seat 430. The seat adjustment module 408 may also be in communication with the sensor module 402, the transceiver 416, the processor 420, the communication module 422, the location module 418, the locomotion module 426, the navigation module 424, and the computer-readable medium 414.

In one configuration, a passenger adjusts the seat 430 via one or more seat controls 436. The seat controls 436 may be in communication with the seat adjustment control module 412 to move the seat 430 to a desired position (e.g., adjusted position). The seat adjustment control module 412 may transmit the seat adjustments to the seat adjustment module 408, such that the seat adjustments are stored in the seat adjustment memory 410. The seat adjustment module 408 may associate the seat adjustments with a passenger profile in the seat adjustment memory 410.

The passenger profile may include personal identification information and/or user device identification information. The personal identification information may be obtained from passenger information obtained via the transceiver 416 and/or communication module 422 when the passenger reserves an MAAS vehicle. The personal identification information may also include facial identification information captured by the first vision sensor 406 and/or the second vision sensor 404. The personal identification information may further include weight/pressure information captured by the seat sensor 432. The user device identification information may be obtained via the transceiver 416 and/or communication module 422 when the passenger reserves an MAAS vehicle and/or when the passenger's device establishes connection (e.g., Bluetooth™ connect) with the vehicle 428.

The seat adjustment module 408 may use information received from one or more of the location module 418, the navigation module 424, and the locomotion module 426 to determine when the vehicle 428 has stopped. For example, the navigation module 424 and/or location module 418 may indicate that the vehicle 428 has arrived at a pre-set destination, such as the passenger's house or a ride-share destination. The locomotion module 426 may indicate that the vehicle 428 has stopped and the engine has been turned off.

In response to determining that the vehicle 428 has stopped, the seat adjustment module 408 may determine whether the passenger has exited the vehicle 428. The seat adjustment module 408 may use information received from the sensor module 402 and/or the processor 420 to determine whether the passenger has exited the vehicle 428. For example, the seat sensor 432 may identify a change in seat pressure, thereby indicating that the passenger has left the seat 430. As another example, the first vision sensor 406 and the second vision sensor 404 may capture images of the passenger exiting the vehicle. In yet another example, the processor 420 may indicate that a door 438 has opened and closed.

In one configuration, in response to determining that the passenger has exited the vehicle, the seat adjustment module 408 returns the seat 430 to a default position. The default position may be stored in the seat adjustment module 408. After returning the seat 430 to the default position, the seat adjustment module 408 may receive information from the sensor module 406 and/or the communication module 422 to determine if an approaching person is a previous passenger.

For example, the sensor module 406 may transmit one or more images of an approaching person captured by the second vision sensor 404. Aspects of the present disclosure are not limited to a single second vision sensor 404, the vehicle 428 may include multiple second vision sensors 404 to capture images of an environment surrounding the vehicle 428. The image(s) may be compared with passenger identification information in the seat adjustment memory 410 to determine if the approaching person is a previous passenger.

As another example, the communication module 422 may transmit a location (e.g., GPS location) of a user device as well as user device identification information. The user device identification information may be compared with user device identification information stored in the seat adjustment memory 410. The user device location may be compared with the vehicle's 428 location obtained from the location module 418 to determine if a person's distance to the vehicle 428 is less than a threshold. In one configuration, if the user device identification information corresponds to a previous passenger and the person's distance is less than the threshold, the seat 430 is adjusted to a position corresponding to the identified previous passenger.

In another configuration, when the passenger exits the vehicle 428, the seat adjustment module 408 predicts whether the passenger will return to the vehicle 428. The prediction may be based on a current location of the vehicle 428, a time remaining for a reservation, whether other passengers remain in the vehicle 428, and/or other factors. The seat 430 remains in the adjusted position if the passenger is predicted to return to the vehicle.

For example, the location module 418 and/or navigation module 424 may provide trip information to the seat adjustment module 408. The trip information may indicate the vehicle's 428 current location and services within a vicinity of the current location. If the location is near a service, such as a gas station, bank, shopping mall, restaurant, etc., the seat adjustment module 408 predicts that the passenger has exited to use the service. As such, the passenger will most likely return to the vehicle 428.

As another example, the seat adjustment module 408 may receive reservation information from the transceiver 416, the navigation module 424, the communication module 422, the processor 420, and/or the computer-readable medium 414. The reservation information provides information regarding a remaining time for a passenger's reservation. For example, the passenger may have reserved the vehicle 428 for a one-way route to a destination. As another example, the passenger may have reserved the vehicle 428 for a time period, such as twenty-four hours. If there is time remaining on the reservation, the seat adjustment module 408 may determine that the passenger is likely to return to the vehicle.

If the seat adjustment module 408 determines that the passenger is likely to return to the vehicle, the current seat position is maintained. Alternatively, if the seat adjustment module 408 determines that the passenger is not likely to return to the vehicle, the seat adjustment module 408 signals the seat adjustment control module 412 to move the seat 430 to a default position. The default position may be stored in the seat adjustment memory 410.

Figure 5:
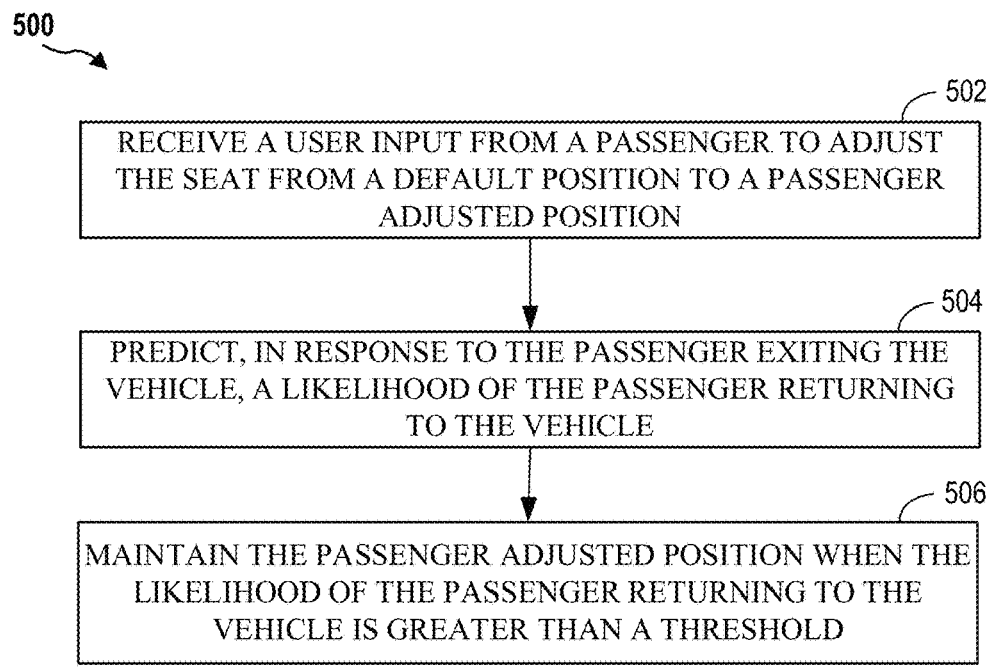
FIG. 5 illustrates a flow diagram for adjusting a seat in a vehicle according to an aspect of the present disclosure, according to aspects of the present disclosure.

FIG. 5 illustrates a method 500 for adjusting a seat in a vehicle, according to an aspect of the present disclosure. As shown in FIG. 5, at block 502, a seat adjustment system receives a user input from a passenger to adjust the seat from a default position to a passenger adjusted position. At block 504, the seat adjustment system predicts, in response to the passenger exiting the vehicle, a likelihood of the passenger returning to the vehicle. The seat adjustment system may determine whether the passenger has exited the vehicle based on a door sensor, a seat pressure sensor, and/or a visual sensor.

The likelihood of the passenger returning to the vehicle may be predicted based on one or more factors. For example, the likelihood of the passenger returning to the vehicle may be predicted based a location where the passenger exited the vehicle, services offered within a range of the location, a time remaining for a vehicle reservation, a number of other passengers in the vehicle, and/or a distance of the passenger to the vehicle after the passenger exited the vehicle. Other factors may also be used to determine the likelihood of the passenger returning to the vehicle.

At block 506, the seat adjustment system maintains the passenger adjusted position when the likelihood of the passenger returning to the vehicle is greater than a threshold. In an optional configuration, the seat adjustment system returns the seat to the default position when the likelihood of the passenger returning to the vehicle is less than a threshold. The default position may be a pre-set position determined by the manufacturer.

Additionally, after a passenger exits the vehicle, the seat adjustment system may identifying a person approaching the vehicle. Furthermore, the seat adjustment system may adjust the seat to a position corresponding to the person when the person is identified as a previous passenger. The seat adjustment system may identify the person based on a visual sensor and/or a location sensor.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for adjusting a seat in a vehicle, comprising:
adjusting the seat from an initial position to a passenger adjusted position based on receiving an input from a passenger;
determining the passenger exited the vehicle after adjusting the seat;
monitoring a location of the passenger after the passenger exited the vehicle;
predicting, in accordance with monitoring the location of the passenger, a likelihood of the passenger returning to the vehicle based on a distance between a current location of the passenger and a location of the vehicle in accordance with monitoring the location of the passenger;
selectively adjusting the seat to the initial position based on the likelihood of the passenger returning to the vehicle, the seat being adjusted to the initial position in accordance with the likelihood being less than a passenger returning threshold and the seat being maintained in the passenger adjusted position in accordance with the likelihood being greater than the threshold;
determining an identity of a person approaching the vehicle, after the passenger exited the vehicle, based on one or more facial features of the person, the one or more facial features being identified via an image captured by an image sensor of the vehicle; and
adjusting the seat from a current position to a position associated with the identity of the person.

2. The method of claim 1, further comprising determining the passenger exited the vehicle based on an indication from one or more of a door sensor, a seat pressure sensor, or a visual sensor.

3. The method of claim 1, further comprising identifying the person based on a comparison of the image with one or more stored images.

4. The method of claim 1, further comprising maintaining the passenger adjusted position when the likelihood of the passenger returning to the vehicle is greater than the passenger returning threshold.

5. The method of claim 1, wherein the one or more passenger return conditions include one or more of a type of location where the passenger exited the vehicle, services offered within a range of the location of the passenger, or a distance between the passenger and the vehicle after the passenger exited the vehicle.

6. An apparatus for adjusting a seat in a vehicle, comprising:
a processor;
a memory coupled with the processor; and instructions stored in the memory and operable, when executed by the processor, to cause the apparatus to:

adjust the seat from an initial position to a passenger adjusted position based on receiving an input from a passenger;

determine the passenger exited the vehicle after adjusting the seat;

monitor a location of the passenger after the passenger exited the vehicle;

predict, in accordance with monitoring the location of the passenger, a likelihood of the passenger returning to the vehicle based on a distance between a current location of the passenger and a location of the vehicle in accordance with monitoring the location of the passenger;

selectively adjust the seat to the initial position based on the likelihood of the passenger returning to the vehicle, the seat being adjusted to the initial position in accordance with the likelihood being less than a passenger returning threshold and the seat being maintained in the passenger adjusted position in accordance with the likelihood being greater than the threshold;

determine an identity of a person approaching the vehicle, after the passenger exited the vehicle, based on one or more facial features of the person, the one or more facial features being identified via an image captured by an image sensor of the vehicle; and adjust the seat from a current position to a position associated with the identity of the person.

7. The apparatus of claim 6, wherein execution of the instructions further cause the apparatus to determine the passenger exited the vehicle based on an indication from one or more of a door sensor, a seat pressure sensor, or a visual sensor.

8. The apparatus of claim 6, wherein execution of the instructions further cause the apparatus to identify the person based on a comparison of the image with one or more stored images.

9. The apparatus of claim 6, wherein execution of the instructions further cause the apparatus to maintain the passenger adjusted position when the likelihood of the passenger returning to the vehicle is greater than the passenger returning threshold.

10. The apparatus of claim 6, wherein the one or more passenger return conditions include one or more of a type of location where the passenger exited the vehicle, services offered within a range of the location of the passenger, or a distance between the passenger and the vehicle after the passenger exited the vehicle.

11. A non-transitory computer-readable medium having program code recorded thereon for adjusting a seat in a vehicle, the program code executed by a processor and comprising:

program code to adjust the seat from an initial position to a passenger adjusted position based on receiving an input from a passenger;

program code to determine the passenger exited the vehicle after adjusting the seat;

program code to monitor a location of the passenger after the passenger exited the vehicle;

program code to predict, in accordance with monitoring the location of the passenger, a likelihood of the passenger returning to the vehicle based on a distance between a current location of the passenger and a location of the vehicle in accordance with monitoring the location of the passenger;

program code to selectively adjust the seat to the initial position based on the likelihood of the passenger returning to the vehicle, the seat being adjusted to the initial position in accordance with the likelihood being less than a passenger returning threshold and the seat being maintained in the passenger adjusted position in accordance with the likelihood being greater than the threshold;

program code to determine an identity of a person approaching the vehicle, after the passenger exited the vehicle, based on one or more facial features of the person, the one or more facial features being identified via an image captured by an image sensor of the vehicle; and program code to adjust the seat from a current position to a position associated with the identity of the person.

12. The non-transitory computer-readable medium of claim 11, wherein the program code further comprises program code to determine the passenger exited the vehicle based on an indication from one or more of a door sensor, a seat pressure sensor, or a visual sensor.

13. The non-transitory computer-readable medium of claim 11, wherein the program code further comprises program code identify the person based on a comparison of the image with one or more stored images.

14. The non-transitory computer-readable medium of claim 11, wherein the program code further comprises program code maintain the passenger adjusted position when the likelihood of the passenger returning to the vehicle is greater than the passenger returning threshold.

15. The non-transitory computer-readable medium of claim 11, wherein the one or more passenger return conditions include one or more of a type of location where the passenger exited the vehicle, services offered within a range of the location of the passenger, or a distance between the passenger and the vehicle after the passenger exited the vehicle.

16. The method of claim 1, wherein monitoring the location of the passenger comprises tracking a location of a mobile device associated with the passenger.

17. The method of claim 1, wherein the initial position is associated with position information received via a wireless update or an average adjusted position.

18. The apparatus of claim 6, wherein execution of the instructions that cause the apparatus to monitor the location of the passenger further cause the apparatus to track a location of a mobile device associated with the passenger.

19. The apparatus of claim 6, wherein the initial position is associated with position information received via a wireless update or an average adjusted position.

20. The non-transitory computer-readable medium of claim 11, wherein the program code to monitor the location of the passenger further comprises program code to track a location of a mobile device associated with the passenger.

* * * * *